United States Patent
Roman et al.

(10) Patent No.: US 7,590,278 B2
(45) Date of Patent: Sep. 15, 2009

(54) MEASUREMENT OF CORNER ROUNDNESS

(75) Inventors: Kris Roman, Jerusalem (IL); Ovadya Menadeva, Modiin (IL); Aviram Tam, Rishon Le Zion (IL); Gidi Gottlib, Nes-Ziona (IL); Liraz Gershtein, Moshav Sitria (IL)

(73) Assignee: Applied Materials, Inc., Santa Clara, CA (US)

( * ) Notice: Subject to any disclaimer, the term of this patent is extended or adjusted under 35 U.S.C. 154(b) by 740 days.

(21) Appl. No.: 10/912,812

(22) Filed: Aug. 6, 2004

(65) Prior Publication Data

US 2005/0069192 A1 Mar. 31, 2005

Related U.S. Application Data

(60) Provisional application No. 60/493,518, filed on Aug. 8, 2003.

(51) Int. Cl.
G06K 9/00 (2006.01)
(52) U.S. Cl. .................................. 382/145; 382/146
(58) Field of Classification Search ......... 382/141–149; 703/2
See application file for complete search history.

(56) References Cited

U.S. PATENT DOCUMENTS

| | | | | |
|---|---|---|---|---|
| 4,939,646 A * | 7/1990 | Essinger et al. | ............. | 382/128 |
| 5,475,766 A * | 12/1995 | Tsuchiya et al. | ............. | 382/144 |
| 5,804,340 A * | 9/1998 | Garza et al. | ............. | 430/5 |
| 6,044,174 A * | 3/2000 | Sinden | ............. | 382/187 |
| 6,195,461 B1 | 2/2001 | Fujita et al. | | |
| 6,556,703 B1 * | 4/2003 | Kane et al. | ............. | 382/145 |
| 6,642,529 B1 * | 11/2003 | Subramanya et al. | ............. | 250/492.2 |
| 6,647,147 B1 * | 11/2003 | Miyano | ............. | 382/199 |
| 6,714,679 B1 | 3/2004 | Scola et al. | | |
| 6,925,202 B2 * | 8/2005 | Karklin et al. | ............. | 382/145 |
| 6,980,937 B2 * | 12/2005 | Hayes | ............. | 703/2 |
| 7,099,005 B1 * | 8/2006 | Fabrikant et al. | ............. | 356/369 |
| 7,152,022 B1 * | 12/2006 | Joshi | ............. | 703/2 |
| 2005/0055658 A1 * | 3/2005 | Mukherjee et al. | ............. | 716/19 |

OTHER PUBLICATIONS

Frank et al, Shape coding using polar coordinates and DCT, 1997, IEEE, 0-8186-8183-7, 516-519.*

Mask Metrology 2D application for measurement of OPC features and Corner Roundness, R Kris et al., SPIE 0277-786X,vol 5446, Nov. 22, 2004 pp. 698-707.*

Corner roundness and contact area algorithms for reticle metrology through the use of region connectivity extraction, R kris et al., SPIE 0277-786X, vol. 5256, Dec. 31, 2003, pp. 619-627.*

Carl De Boor, "A Practical Guide to Splines", *Publisher: Springer-Verlag Telsos*; Reprint Edition., (Aug. 26, 1994),pp. 234-241.

(Continued)

*Primary Examiner*—Brian P Werner
*Assistant Examiner*—Jayesh Patel
(74) *Attorney, Agent, or Firm*—Tarek N. Fahmi

(57) ABSTRACT

A method for analyzing an image includes identifying a curved segment of a contour that is associated with noise. The curved segment is smoothed so as to reduce the noise that is associated with the curved segment, thereby providing a smoothed segment. The smoothed segment is transformed to a natural coordinate system, thereby providing a transformed segment. A line is fitted to the transformed segment in order to determine a radius of curvature of the curved segment.

19 Claims, 4 Drawing Sheets

OTHER PUBLICATIONS

Davies, E.R., "Machine Vision: Theory, Algorithms, Practicalities—2nd Edition", 1997, *Academic Press*, San Diego, London, pp. 171-191.

Jain, Anil K., "Fundamentals of Digital Image Processing", *Prentice-Hall International, Inc.*, New Jersey, 1989, pp. 342-362.

Kris, R., "CD SEM Application for Generic Analysis of Two Dimensional Features on Wafers and Reticles", *Proc. of SPIE*, vol. 5375, Jerusalem, Israel, 2004, p. 1224.

Kris, R., "Contatct Area Algorithm For Mask Metrology Through The Use of Region Connectivity Extraction", *Proc. of 20th European Mask Conference* (EMC 2004) VDE 43, p. 175.

Kris, R., et al., "Corner Roundness And Contact Area Algorithms For Reticle Metrology Through the Use of Region Connectivity Extraction", *Proc. of SPIE—23rd Annual BACUS Symposium on Photomask Technology*, vol. 5256, (Sep. 3, 2003), pp. 619-627.

Kris, R., "Mask Metrology 2D Application For Measurement of OPC Features and Corner Roundness", *Proc. of SPIE*, vol. 5446 (2004).

Lee, Chang-Kyu, et al., "Estimation of Curvature From Sampled Noisy Data", *Computer Vision & Pattern Recognition, IEEE Society Conference on New York*, NY, Los Alamitos, CA, (Jun. 15, 1993), pp. 536-541.

Leunissen, L.H.A., et al., "Determining the Transfer Function of a Mask Fabrication Process", *Proc. of 20th European Mask Conference* (EMC 2004) VDE 43, p. 57.

Parikh, Ashesh, et al., "Quantification of OPC Performance of 150nm Gataes Using Top-Down CD SEM", *Proc. of SPIE—Metrology, Inspection, and Process Control For Microlithography XVI*, vol. 4689, (Mar. 4, 2002).

Philipsen, Vicky, et al., "Printability of 2D Mask Quality", *Proc. of SPIE, V5256, 23 Annual BACUS Symp. On Photomask Technology* (2003), 11 pgs.

Search Report, "International Searching Authority", PCT/US2004/025551, (Dec. 10, 2004).

SEMI P43-0304, "Photomask Qualification Terminology", *SEMI 2004*, p. 1-15.

Sohn, Kwanghoon, et al., "Optimal Boundary Smoothing For Curvature Estimation", *Dept. of ECE, NCSU*, Raleigh, NC, 1991, pp. 1220-1224.

Stratikov, Alexander, "Design Rules For Real Patterns", *IEEE workshop on Electronic Design Process EDP* (2003). Santa Clara, CA, 8 pgs.

Worring, Marcel, et al., "The Accuracy and Precision of Curvature Estimation Methods", 1992, Amsterdam, Holland, pp. 139-142.

Yasumoto, Yoshio, "Corner Detection and Curve Representation Using Cubic B-Splines", *Systems & Computers in Japan, Scripta Technica Journals*, New York, vol. 19, No. 12, (Dec. 1, 1988), pp. 73-80.

* cited by examiner

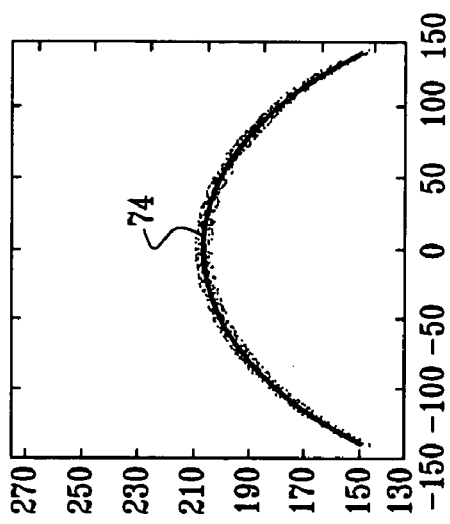
FIG. 7A
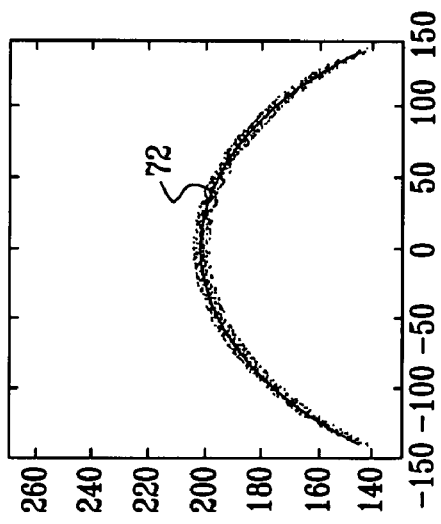
FIG. 7B
FIG. 7C
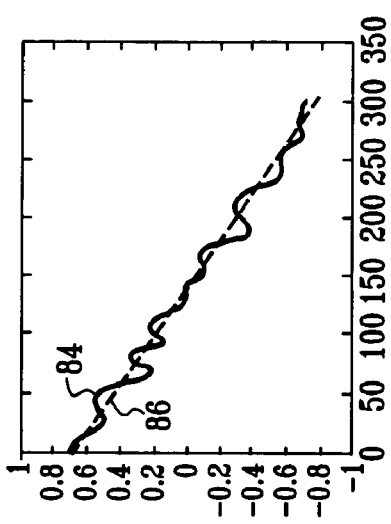
FIG. 8A
FIG. 8B
FIG. 8C

MEASUREMENT OF CORNER ROUNDNESS

CROSS-REFERENCE TO RELATED APPLICATION

This application claims the benefit of U.S. provisional patent application 60/493,518, filed Aug. 8, 2003, which is incorporated herein by reference.

FIELD OF THE INVENTION

The present invention relates generally to image processing, and specifically to measuring the roundness of corners of a structure in an image, such as rectangular structures in a microscopic image of a semiconductor wafer or reticle.

BACKGROUND OF THE INVENTION

Structures in reticles and in layers produced on semiconductor wafers by photolithography are generally designed to have square corners. In practice, however, the limitations inherent in fabrication techniques inevitably result in some rounding of the corners. Such rounding may have adverse effects on the performance of microcircuits that incorporate the structures. For example, rounding of the corners of a contact pad reduces the effective contact area and may thus increase the contact resistance. The extent to which corners are rounded may be qualitatively observed in scanning electron microscope (SEM) images of the reticle or wafer, but there is a need for reliable, quantitative techniques for automatically measuring corner curvatures in such images.

Various methods are known in the art of image processing for estimating the curvature of a boundary or edge in an image. For example, Lee et al. describe a method for estimation of curvature using cubic polynomial fitting, in "Estimation of Curvature from Sampled Noisy Data," *Computer Vision and Pattern Recognition* 1993 (Proceedings of CVPR '93, IEEE), pages 536-541, which is incorporated herein by reference.

As another example, U.S. Pat. No. 6,714,679, whose disclosure is incorporated herein by reference, describes a method for analyzing a boundary of an object in an image. The boundaries are represented as a set of indexed vertices, which are generated by parsing the boundaries into a set of segments. In one embodiment, the curvature of the boundary is approximated by taking the derivative of the local tangent to the boundary. The boundary is segmented by locating the local maxima in the curvature and walking both sides of each maximum until a threshold curvature change on each side of the maximum has been met.

As still another example, U.S. Pat. No. 6,195,461, whose disclosure is incorporated herein by reference, describes an image processing method for accurately reproducing an edge part at which luminance abruptly changes. This patent describes methods for analyzing and synthesizing a curve on a plane based on the unit tangent vector to the curve.

SUMMARY OF THE INVENTION

Although various methods for curvature analysis are known in the art, and may work adequately in some cases, these methods often fail to provide accurate curvature measurements when applied to image features that have noisy edges, i.e., edges that are characterized by random, high-frequency fluctuations. Such noise is a common feature of SEM images. Embodiments of the present invention overcome these shortcomings of the prior art by providing improved methods and systems for automatic curvature measurement, which are reliable even in the presence of substantial noise. These methods and systems are particularly useful in determining corner roundness of features in semiconductor wafers and reticles, but they may also be applied in other areas of image processing.

In some embodiments of the present invention, an image processor receives a definition of a contour in an image, wherein the contour is typically the edge of a feature of interest in the image. The image processor locates curved segments of the contour, which typically correspond to corners of the feature, and then applies a smoothing function to reduce the noise associated with the curves. Typically, the smoothing function comprises a polynomial, such as a spline, which the image processor fits to each of the corners. The smoothed curve is then transformed from Cartesian coordinates to a natural coordinate system, in which each point along the curve is represented by its distance along the curve from the origin and the slope of a tangent to the curve at the point. The term "natural coordinates," as used in the context of the present patent application and in the claims, refers specifically to this sort of <distance, slope> coordinates.

Straight segments in the natural coordinate representation of a curve correspond to segments of approximately constant curvature in the Cartesian coordinates. Straight segments of this sort are expected to occur in the vicinity of rounded corners in the image. Therefore, the image processor analyzes the curves in natural coordinates in order to locate such straight segments, and then fits a straight line to each such segment. The slope of this straight line gives an accurate measure of the curvature of the corresponding corner, even in the presence of substantial noise in the original image.

There is therefore provided, in accordance with an embodiment of the present invention, a method for analyzing an image, including:

identifying a curved segment of a contour that is associated with noise;

smoothing the curved segment so as to reduce the noise that is associated with the curved segment, thereby providing a smoothed segment;

transforming the smoothed segment to a natural coordinate system, thereby providing a transformed segment; and fitting a line to the transformed segment in order to determine a radius of curvature of the curved segment.

In a disclosed embodiment, the contour represents an edge of a feature in the image, and identifying the curved segment includes locating a corner of the feature. Typically, the feature corresponds to an element of an integrated circuit, and the image is a scanning electron microscope (SEM) image of a semiconductor wafer or a reticle used in fabricating the integrated circuit.

In a disclosed embodiment, smoothing the curved segment includes fitting a smoothing spline to the curved segment.

Typically, the natural coordinate system includes a first coordinate corresponding to a distance along the smoothed segment and a second coordinate corresponding to a slope of the smoothed segment. In one embodiment, transforming the smoothed segment includes transforming the smoothed segment f(x) from Cartesian coordinates (x,y) to natural coordinates (s,φ) in accordance with a transformation that is represented by $$\varphi = \arctan \frac{df(x)}{dx}, \quad s = \int_0^x \sqrt{1 + [f(x)]^2}\, dx.$$

Typically, fitting the line includes performing a least-square fit of a straight line to the curved segment, and determining the radius of curvature responsively to a slope of the line.

There is also provided, in accordance with an embodiment of the present invention, apparatus for analyzing an image, including an image processor, which is adapted to identify a curved segment of a contour that is associated with noise, to smooth the curved segment so as to reduce the noise that is associated with the curved segment, thereby providing a smoothed segment, to transform the smoothed segment to a natural coordinate system, thereby providing a transformed segment, and to fit a line to the transformed segment in order to determine a radius of curvature of the curved segment. There is additionally provided, in accordance with an embodiment of the present invention, a computer software product, including a computer-readable medium in which program instructions are stored, which instructions, when read by a computer, cause the computer to identify a curved segment of a contour that is associated with noise, to smooth the curved segment so as to reduce the noise that is associated with the curved segment, thereby producing a smoothed segment, to transform the smoothed segment to a natural coordinate system, thereby producing a transformed segment, and to fit a line to the transformed segment in order to determine a radius of curvature of the curved segment.

The present invention will be more fully understood from the following detailed description of the embodiments thereof, taken together with the drawings in which:

BRIEF DESCRIPTION OF THE DRAWINGS

FIGS. 7A-7C are schematic plots showing synthetic curves with differing amounts of noise; and FIGS. 8A-8C are schematic plots showing the curves of FIGS. 7A-7C in natural coordinates, along with straight lines fitted to the curves, in accordance with an embodiment of the present invention.

DETAILED DESCRIPTION OF EMBODIMENTS

Figure 1:
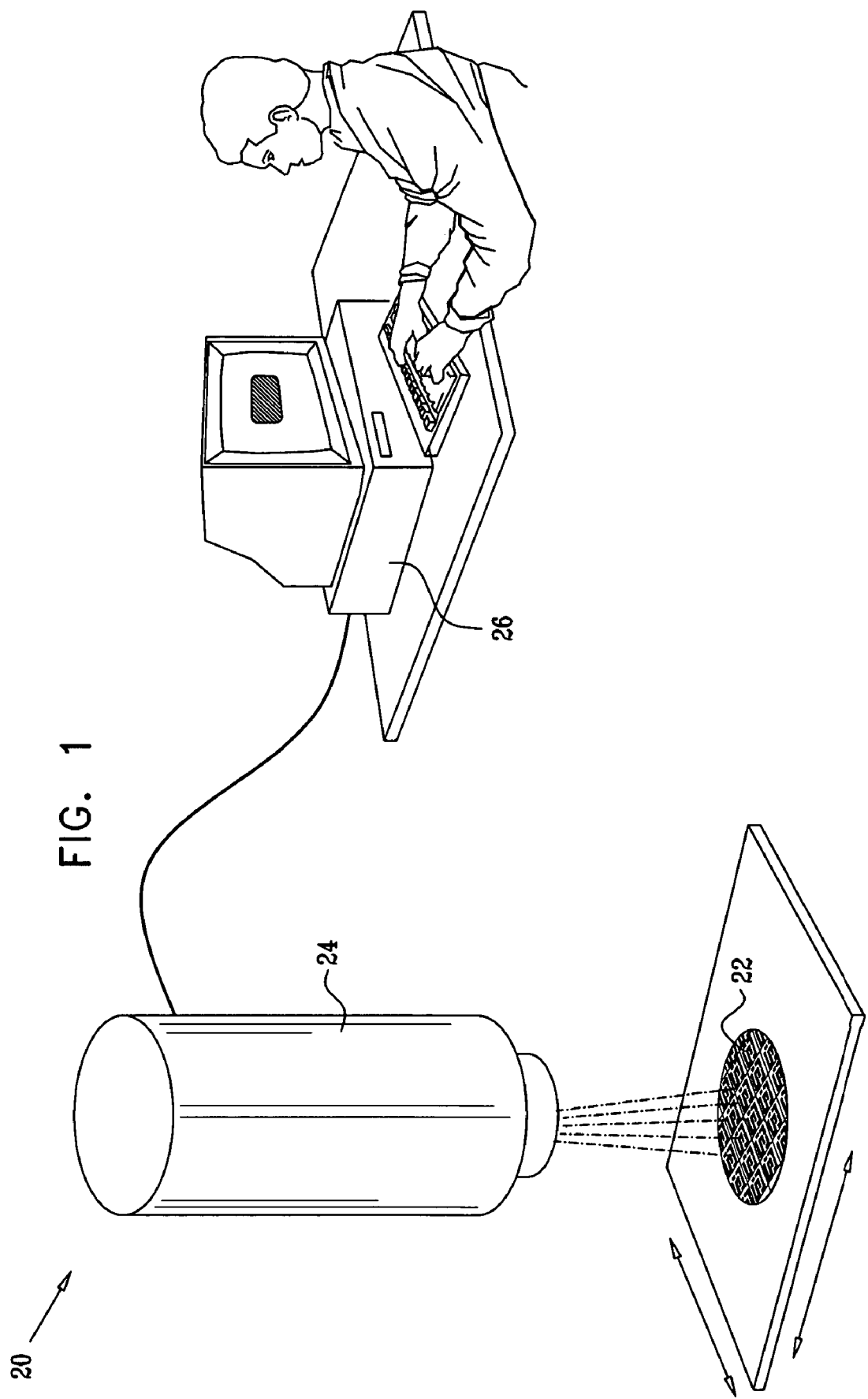
FIG. 1 is a schematic, pictorial illustration of a system for image capture and analysis, in accordance with an embodiment of the present invention.

FIG. 1 is a schematic pictorial illustration of a system 20 for inspection of a sample 22, such as a semiconductor wafer, in accordance with an embodiment of the present invention. System 20 is built around means for providing high-resolution images of the sample. Typically, the means comprise a SEM 24, which images an area of sample 22 using a scanning electron beam. The sample may be mounted on a translation stage (not shown), to permit different areas of the sample surface to be imaged. Alternatively or additionally, the means for providing the high-resolution images may comprise a data storage device, which stores and recalls the images as required.

The images of sample 22 are input to an image processor 26 for image enhancement and analysis. The image processor may be a standalone unit, as shown in FIG. 1, or it may be integrated into a single unit with the SEM itself. Typically, processor 26 comprises a general-purpose computer, which is programmed in software to carry out the image processing functions described hereinbelow. The software may be loaded into processor 30 in electronic form, over a network link, for example, or it may alternatively be provided on tangible media, such as CD-ROM. Alternatively or additionally, some of the functions of processor 26 may be carried out by dedicated or semi-custom hardware circuits. Although processor 26 is shown in FIG. 1 as a separate unit from SEM 24, the image processor may alternatively be integrated into the SEM, and the software for carrying out the functions provided by the present invention may be provided as a software upgrade to an existing image processor of this sort.

Figure 2:
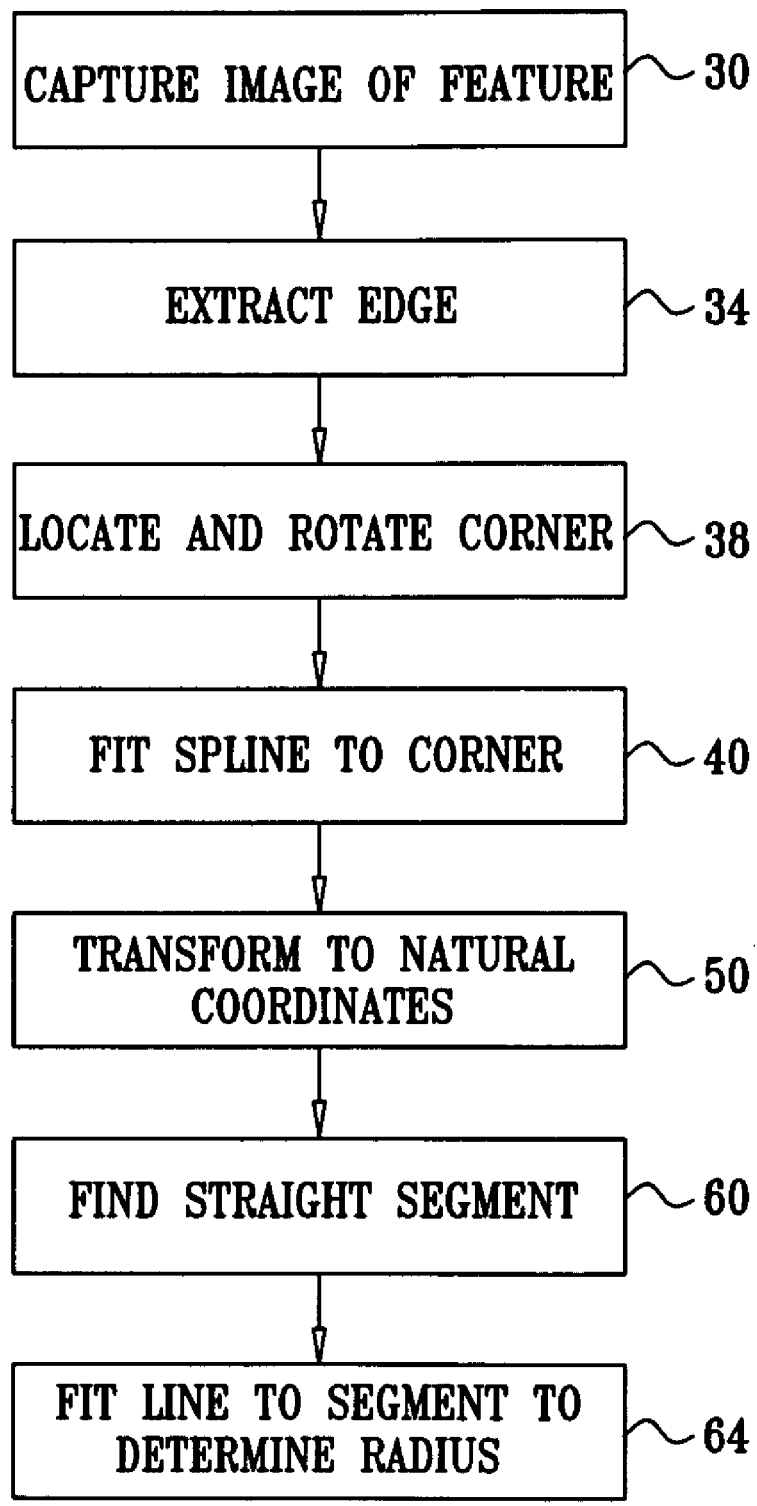
FIG. 2 is a flow chart that schematically illustrates a method for determining the curvature of edges of a feature in an image, in accordance with an embodiment of the present invention.
Figure 3:
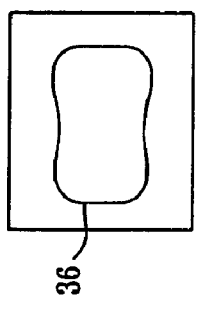
FIGS. 3 and 4, respectively, are schematic representations of a feature in an image and of an edge of the feature.

Reference is now made to FIGS. 2-4, 5A-D and 6A-D, which schematically illustrate a method for estimating the curvature of corners of a feature 32 in an image of sample 22, in accordance with an embodiment of the present invention. FIG. 2 is a flow chart that shows steps in the method, while the remaining figures show the results of successive steps. To begin the method, SEM 24 captures an image of the feature of interest, at an image capture step 30. In the example shown in FIG. 3, feature 32 is a contact pad that is supposed to be rectangular in shape, with square corners. Due to shortcomings of the reticle and photolithography system used to create feature 32 on sample 22, however, the corners of the feature are rounded.

Figure 4:
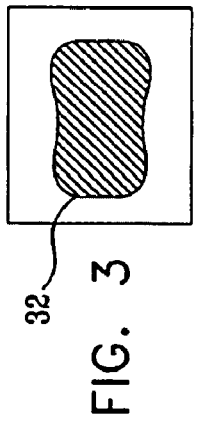
Figure 5A:
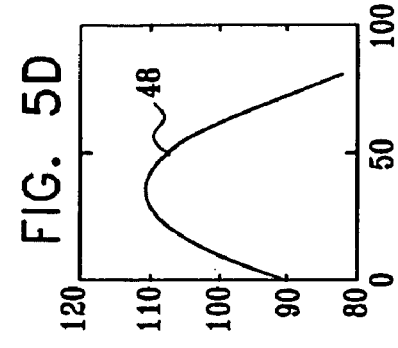
FIGS. 5A-5D are schematic plots showing the corners of the edge of FIG. 4 in Cartesian coordinates, after fitting of spline curves to the edge, in accordance with an embodiment of the present invention.
Figure 5B:
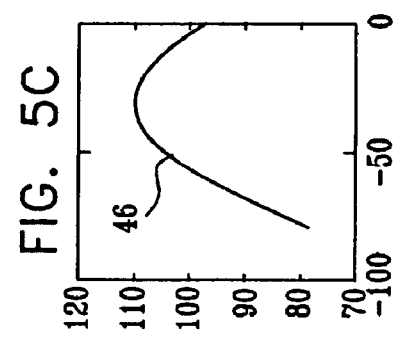
Figure 5C:
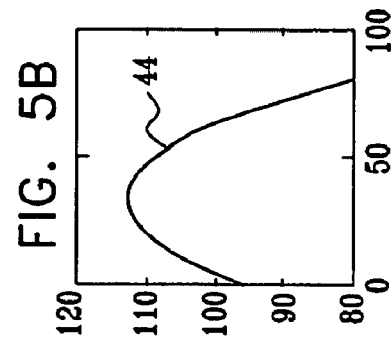
Figure 5D:
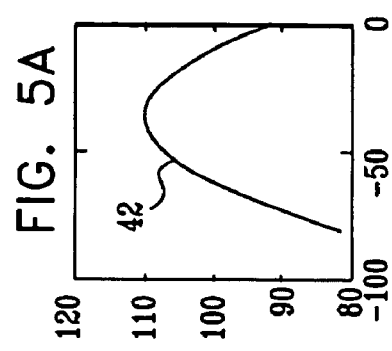
Figure 6A:
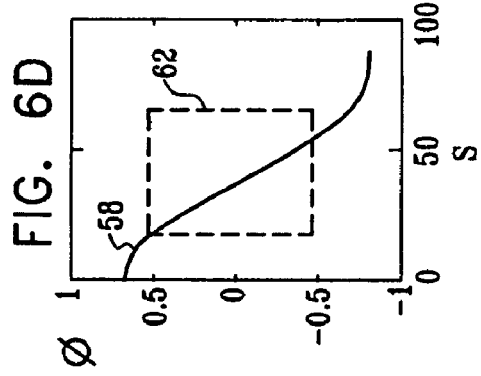
FIGS. 6A-6D are schematic plots showing the corners of FIGS. 5A-5D as represented in natural coordinates, in accordance with an embodiment of the present invention.
Figure 6B:
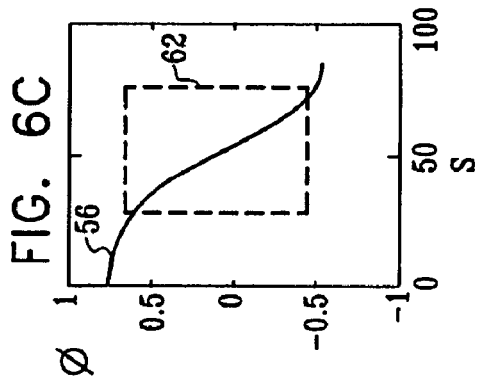
Figure 6C:
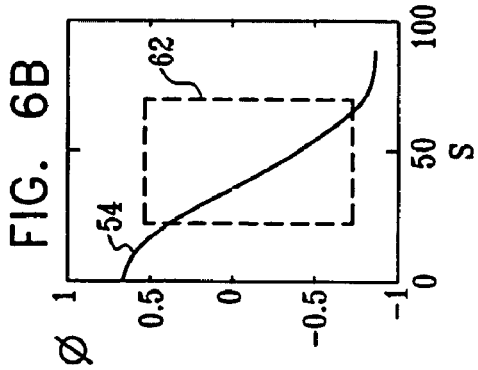
Figure 6D:
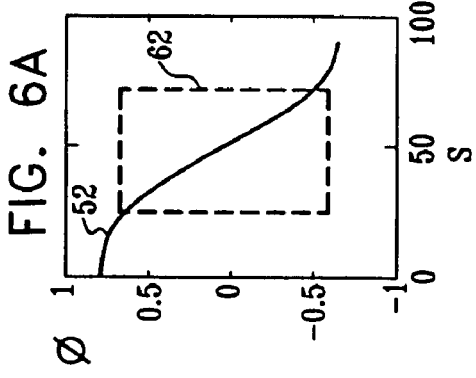

In preparation for measuring the corner curvatures, image processor 26 locates an edge 36 of feature 32, at an edge extraction step 34. The resulting contour, representing the outer edge of the feature, is shown in FIG. 4. Normally, the edge is characterized by noise, as illustrated, for example, in FIGS. 7A-7C below. For simplicity of illustration, however, the noise is suppressed in FIG. 4. Edge 36 may be extracted from the image of feature 32 using any suitable method known in the art, and the choice of method for edge or contour extraction is beyond the scope of the present invention. A variety of techniques for this purpose are described, for example, by Jain in Chapter 9 of *Fundamentals of Digital Image Processing* (Prentice Hall, New Jersey, 1989), which is incorporated herein by reference.

Image processor 26 locates one or more corners of edge 36, and crops the corners from the image for further processing, at a corner location step 38. The corners may be located, for example, by matching edge 36 to a template of the feature in question or by finding the maxima and minima in the rate of change of direction of the edge. The cropped corners are rotated in the Cartesian plane so that each corner has a functional form (i.e., a unique value of Y for each X). In discrete terms, each corner is now represented by a set of points $\{y_i(x_i)\}$, i=1, ..., N.

The image processor next fits a smoothing spline curve $\{f(x_i)\}$, such as a cubic spline, to each corner, at a spline fitting step 40. The coefficients of the spline function are calculated so as to minimize the functional $\Delta f^2$, which is defined as follows:

$$\Delta f^2 = p \sum_{i=1}^{N}(y_i - f(x_i))^2 + (1-p) \int_{x_1}^{x_N}[f''(t)]^2 dt \quad (1)$$

Here p∈[0,1] is a parameter that is chosen empirically to control the degree of smoothing of local perturbations in the original curve $y_i$. Equation (1) may be set up and solved, for example, using the smoothing spline technique of Schoenberg and Reinsh, as defined by de Boor in Chapter XIV of *A Practical Guide to Splines* (Springer-Verlag, Berlin, 2001), which is incorporated herein by reference. The spline curves resulting from step 40 are shown as curves 42, 44, 46 and 48 in FIGS. 5A-5D, corresponding to the four corners of edge 36. Again, the effect of noise is eliminated from these figures for the sake of simplicity. Alternatively, the image processor may apply other methods of curve smoothing that are known in the art in order to reduce the noise in $y_i$.

Image processor 26 now transforms the smoothed curve $f(x_i)$ to natural coordinates, at a coordinate transformation step 50. Formally, the transformation is given by:

$$\varphi = \arctan\frac{df(x)}{dx} \quad (2)$$
$$s = \int_0^x \sqrt{1 + [f(x)]^2}\, dx$$

In other words, φ is the slope at each point of the smoothed curve in the original Cartesian coordinates, while s is the distance along the curve from the origin. As a result of this step, curves 42, 44, 46 and 48 are respectively transformed into curves 52, 54, 56 and 58 in the natural coordinate system, as shown in FIGS. 6A-6D. Although it would have been possible to transform the original curves {$y_i(x_i)$} directly into the natural coordinates, prior smoothing by the spline function f(x) is useful as a filtering step beforehand, in order to avoid large excursions due to noise in the calculation of φ.

Circular segments in the original Cartesian coordinates (as are seen at the corners of edge 36) will appear as straight lines in the natural coordinates of equation (2). The radius of curvature R of such circular segments is simply the inverse of the slope of the corresponding line in the natural coordinates, i.e., $$R = \Delta s / \Delta \varphi.$$

For this reason, image processor 26 locates segments in natural coordinate curves 52, 54, 56 and 58 that are approximately straight, at a segment finding step 60. Any suitable method known in the art may be used for this purpose. For example, the image processor may apply a Hough transform to the curves. The segments selected in this manner are shown within boxes 62 in FIGS. 6A-6D. Alternatively, the image processor may select the parts of the curves in natural coordinates that fall within a certain range of values of φ, which are expected to correspond to the corners of edge 36.

Finally, the image processor fits a straight line to each of the straight segments, at a line fitting step 64. The slope of this line, as noted above, gives the radius of curvature of each corner. A least-square fit has been found to give good results, with robust and precise measurement of the radii. Alternatively, other fitting methods known in the art may be used.

Reference is now made to FIGS. 7A-7C and 8A-8C, which schematically illustrate the application of the method of FIG. 2 to noisy curves, in accordance with an embodiment of the present invention. In this case, the data shown in FIGS. 7A-7C correspond to a circular arc in Cartesian coordinates, with R=200 (in arbitrary units), and with differing amounts of added noise. The noise amplitude ranges from 2 in FIG. 7A to 10 in FIG. 7C. Curves 70, 72 and 74 represent the smoothing spline functions that have been fitted to the data in each case. FIGS. 8A-8C show corresponding curves 80, 82 and 84 in the natural coordinate system. A dashed line 86 in each of these figures represents the least-square fit of a straight line to each of curves 80, 82 and 84. It can be seen that line 86 provides an accurate reading of the curvature even under the high-noise conditions of curve 84.

Although the embodiments described above are directed specifically to analyzing corner curvature in an integrated circuit pattern, the principles of the present invention may similarly be used to determine curvatures of contours in other image processing applications. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for analyzing an image, comprising:
   receiving the image by an image processor from a data storage device;
   locating, via the image processor, a contour of a feature in the image;
   identifying, via the image processor, a curved segment of the contour that is associated with noise;
   rotating, via the image processor, the curved segment of the contour in a Cartesian coordinate system so as to express the curved segment in functional form;
   smoothing, via the image processor, the curved segment of the contour in the Cartesian coordinate system so as to reduce the noise that is associated with the curved segment, thereby providing a smoothed segment;
   transforming, via the image processor, the smoothed segment from the Cartesian coordinate system to a natural coordinate system, thereby providing a transformed segment;
   fitting, via the image processor, a line to the transformed segment; and
   determining, via the image processor, a radius of curvature of the curved segment based on the line fitted to the transformed segment.

2. The method according to claim 1, wherein the contour represents an edge of a feature in the image, and wherein identifying the curved segment comprises locating a corner of the feature.

3. The method according to claim 2, wherein the feature corresponds to an element of an integrated circuit, and wherein the image is a scanning electron microscope (SEM) image of a semiconductor wafer used in fabricating the integrated circuit.

4. The method according to claim 2, wherein the feature corresponds to an element of an integrated circuit, and wherein the image is a scanning electron microscope (SEM) image of a reticle used in fabricating the integrated circuit.

5. The method according to claim 1, wherein smoothing the curved segment comprises fitting a smoothing spline to the curved segment.

6. The method according to claim 1, wherein the natural coordinate system comprises a first coordinate corresponding to a distance along the smoothed segment and a second coordinate corresponding to a slope of the smoothed segment.

7. The method according to claim 1, wherein transforming the smoothed segment comprises transforming the smoothed segment from the Cartesian coordinate system to the natural coordinate system in accordance with a transformation that is represented by $$\varphi = \arctan\frac{df(x)}{dx}, s = \int_0^x \sqrt{1 + [f(x)]^2}\, dx.$$

wherein f(x) represents the smoothed segment in the Cartesian coordinate system, (x,y) are coordinates in the Cartesian coordinate system, the y coordinate is f(x) evaluated at the x coordinate, and (s,φ) are coordinates in the natural coordinate system.

8. The method according to claim 1, wherein fitting the line comprises performing a least-square fit of a straight line to the transformed segment.

9. The method according to claim 1, wherein determining the radius of curvature comprises determining the radius of curvature responsively to a slope of the line.

10. An apparatus for analyzing an image, comprising an image processor, which is adapted to locate a contour of a feature of the image, identify a curved segment of the contour that is associated with noise, rotate the curved segment of the contour in a Cartesian coordinate system so as to express the curved segment in functional form, smooth the curved segment of the contour in the Cartesian coordinate system so as to reduce the noise that is associated with the curved segment, thereby providing a smoothed segment, transform the smoothed segment from the Cartesian coordinate system to a natural coordinate system, thereby providing a transformed segment, fit a line to the transformed segment, and determine a radius of curvature of the curved segment based on the line fitted to the transformed segment.

11. The apparatus according to claim 10, wherein the contour represents an edge of a feature in the image, and wherein the curved segment corresponds to a corner of the feature.

12. The apparatus according to claim 11, wherein the feature corresponds to an element of an integrated circuit, and wherein the image is a scanning electron microscope (SEM) image of a semiconductor wafer used in fabricating the integrated circuit.

13. The apparatus according to claim 11, wherein the feature corresponds to an element of an integrated circuit, and wherein the image is a scanning electron microscope (SEM) image of a reticle used in fabricating the integrated circuit.

14. The apparatus according to claim 10, wherein the image processor is adapted to smooth the curved segment by fitting a smoothing spline to the curved segment.

15. The apparatus according to claim 10, wherein the natural coordinate system comprises a first coordinate corresponding to a distance along the smoothed segment and a second coordinate corresponding to a slope of the smoothed segment.

16. The apparatus according to claim 10, wherein the image processor is adapted to transform the smoothed segment from the Cartesian coordinate system to the natural coordinate system in accordance with a transformation that is represented by $$\varphi = \arctan\frac{df(x)}{dx}, s = \int_0^x \sqrt{1 + [f(x)]^2}\, dx.$$

wherein f(x) represents the smoothed segment in the Cartesian coordinate system, (x,y) are coordinates in the Cartesian coordinate system, the y coordinate is f(x) evaluated at the x coordinate, and (s,φ) are coordinates in the natural coordinate system.

17. The apparatus according to claim 10, wherein the image processor is adapted to perform a least-square fit of a straight line to the transformed segment.

18. The apparatus according to claim 10, wherein the image processor is adapted to determine the radius of curvature responsively to a slope of the line.

19. A computer-readable medium, having stored thereon program instructions, which instructions, when read by a computer, cause the computer to locate a contour of a feature of the image, identify a curved segment of the contour that is associated with noise, rotate the curved segment of the contour in a Cartesian coordinate system so as to express the curved segment in functional form, smooth the curved segment of the contour in the Cartesian coordinate system so as to reduce the noise that is associated with the curved segment, thereby producing a smoothed segment, transform the smoothed segment from the Cartesian coordinate system to a natural coordinate system, thereby producing a transformed segment, fit a line to the transformed segment, and determine a radius of curvature of the curved segment based on the line fitted to the transformed segment.

* * * * *